United States Patent [19]

Moore

[11] Patent Number: 5,636,782
[45] Date of Patent: Jun. 10, 1997

[54] ENVELOPE WITH 3-D IMAGE VIEWING FEATURES

[75] Inventor: Glenn H. Moore, Beachwood, Ohio

[73] Assignee: Mail-Well Corporation, Englewood, Colo.

[21] Appl. No.: 501,308

[22] Filed: Jul. 12, 1995

[51] Int. Cl.$^6$ ............................................. B65D 27/04
[52] U.S. Cl. .......................... 229/71; 206/5; 229/68.1; 229/116.1; 359/474
[58] Field of Search ................... 229/71, 116.1, 229/162, 68.1, 92.8; 206/5; 359/474, 477; 283/56, 116

[56] References Cited

U.S. PATENT DOCUMENTS

| | | | |
|---|---|---|---|
| 944,385 | 12/1909 | Spiegel | 229/92.8 |
| 1,358,436 | 11/1920 | Gray | 229/71 |
| 2,085,414 | 6/1937 | Cavanagh | 446/73 |
| 2,283,777 | 5/1942 | Wendling | 229/92.8 |
| 2,714,448 | 8/1955 | Brown | 206/5 |
| 3,291,300 | 12/1966 | Rosen | 206/457 |
| 3,370,781 | 2/1968 | Sroge | 229/71 |
| 3,430,761 | 3/1969 | Pelkey | 229/92.8 |
| 4,018,515 | 4/1977 | Derkas | 351/47 |
| 4,648,548 | 3/1987 | Shin | 229/103 |
| 5,156,266 | 10/1992 | Sykora | 229/162 |

*Primary Examiner*—Stephen P. Garbe
*Attorney, Agent, or Firm*—Sheridan Ross P.C.

[57] ABSTRACT

In accordance with the present invention, an envelope is provided that includes 3-D glasses delineated on at least one side of the envelope. The glasses are removable from the envelope and usable for viewing objects not readily visible without the use of the glasses, such as messages contained on the exterior of the envelope, or on paper matter contained within the envelope. In one embodiment of the present invention, perforations are provided along the outer edge of the glasses to allow for the removal of the glasses from the envelope without the use of a cutting device.

19 Claims, 3 Drawing Sheets

ENVELOPE WITH 3-D IMAGE VIEWING FEATURES

FIELD OF THE INVENTION

The present invention relates to the field of envelopes and more specifically to a novelty envelope having 3-D image viewing features.

BACKGROUND OF THE INVENTION

Traditionally, the primary function of envelopes has been to identify the intended recipient and protect contents during transport, including transport via an intermediate carrier delivery system such as the United States Postal Service. In the latter regard, it is an inherent requirement that envelopes be capable of withstanding the rigorous handling normally associated with transport via a carrier delivery system.

More recently, with the increased use of direct mail advertising, envelope designs are also being employed to differentiate and thereby attract a recipient's attention. For example, the exterior of many envelopes now include unique colors and patterns. Further, the exterior of many envelopes now prompt recipients to open the same by creating a special interest or curiosity as to the contents. For example, a printed message on the envelope can partially describe the contents of the envelope in an enticing way, or an opening on the envelope can be used to allow the recipient to preview a select portion of the contents of the envelope.

Similarly, for envelopes used with special occasion cards, invitation, or the like, there is an increasing use of external features to impart interest or frivolity. For example, the exterior of such envelopes may include a special message applicable to the intended recipient and suggesting the nature of the contents, thereby enhancing the anticipation and enjoyment of the recipient.

SUMMARY OF THE INVENTION

It is an objective of the present invention to provide a novelty envelope having features that create interest and curiosity as to the contents, and that can be employed to convey special images. It is a related objective that the envelope be able to withstand the rigors of a carrier delivery system.

In accordance with the present invention, an envelope is provided having first and second sides, one of which includes a delineated portion defining part of that side, and at least one window with an optical radiation filter positioned within the delineated portion for viewing 3-D printed matter contained on the envelope or the envelope's contents. Preferably, the delineated portion is separable for hand-held use by a recipient, and for such purposes the envelope may advantageously comprise perforations (openings, cuts or slits). In this regard, it has been found that in order to withstand the rigors of handling, the perforations should comprise a length at least about 0.025 inch and no more than about 0.75 inch with no more than about 0.020 inch between adjacent perforations.

In one embodiment, the delineated portion includes two spaced windows, or eye openings, and is otherwise configured to define 3-D viewing glasses. The eye openings are preferably spaced no more than about 1¾ inch between their internal edges, and each have a width of at least about 1 5/16 inch and a height of at least about ⅞ inch.

Preferably, to most-readily yield the desired 3-D effect, the two optical radiation filters filter optical radiation of differing wavelengths. For example, the optical radiation filter positioned in one eye opening can be provided to filter optical radiation having a wavelength of about 4550 Angstroms to about 4920 Angstroms, and the optical radiation filter positioned in the other eye can be provided to filter optical radiation having a wavelength of about 6220 Angstroms to about 7700 Angstroms. Correspondingly, the printed matter on the envelope or within the envelope contents can include a first portion which is only visible through one of the openings, (i.e., printed to be visible at a particular wavelength spectrum), and a second portion which is only visible through the other of the openings (i.e., printed to be visible at another wavelength spectrum), so as to yield the desired 3-D effect when viewed utilizing the 3-D glasses. Alternatively, an optical radiation filter positioned in both eye openings to filter optical radiation having a wavelength of about 6220 Angstroms to about 7700 Angstroms. In this regard, the printed matter on the envelope or within the envelope contents can include a first portion which is only visible through both eye openings.

The 3-D glasses defined by the delineated portion may include temple tabs, a nose notch and a bridge notch. The temple tabs provide the user a place to hold the glasses during image viewing. Additionally, when perforations are employed, the temple tabs provide a convenient place to grasp for easy removal of the glasses from the envelope. The nose notch is provided to assist a user with aligning the glasses with the recipient's eyes and to block light from entering along the bottom edge of the glasses during use. The bridge notch is provided to block light from entering along the top edge of the glasses.

When perforations (openings, cuts or slits) are employed, the perforations along the edge of the temple tab are at least about 0.25 inch and no more than about 0.75 inch with no more than about 0.020 inch between adjacent perforations. The perforations along the edge of the nose notch have a length at least about 0.025 inch and no more than about 0.050 inch with no more than about 0.010 inch between adjacent perforations. The perforations along the edge of the bridge notch have a length at least about 0.025 inch and no more than about 0.050 inch with no more than about 0.010 inch between adjacent perforations.

In another embodiment of the invention, an envelope is provided having a first side, which includes a delineated portion, and a second side, which includes at least one window and an optical radiation filter positioned within the window. The delineated portion is removable from the envelope leaving a portion of the second side exposed for viewing through the optical radiation filter.

As will be appreciated, the inclusion of 3-D viewing features in the present invention allows creative images to be communicated to a recipient. Further, since such images may not be readily discernible without use of the 3-D viewing features, the curiosity and interest of a recipient are peaked.

DETAILED DESCRIPTION OF THE PREFERRED EMBODIMENT

Figure 1:
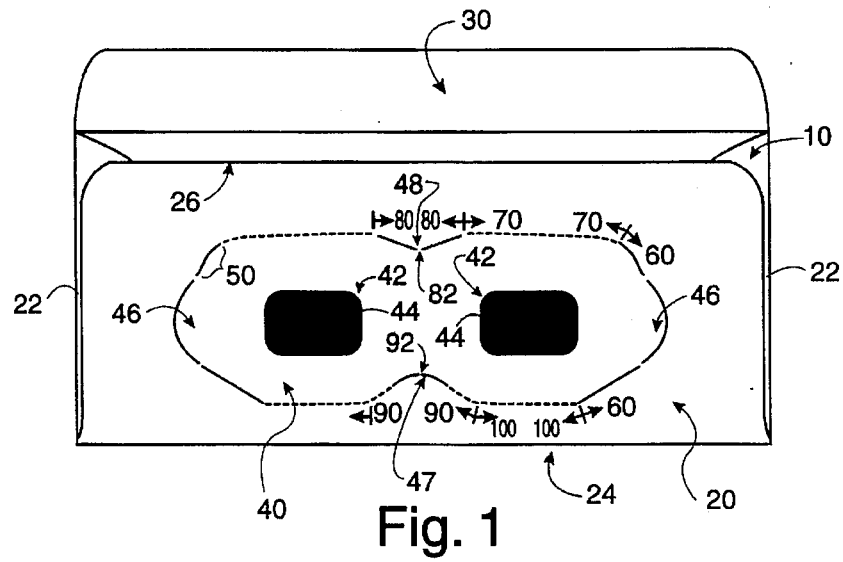
FIG. 1 shows a perspective view of an embodiment of an envelope according to the present invention.
Figure 2:
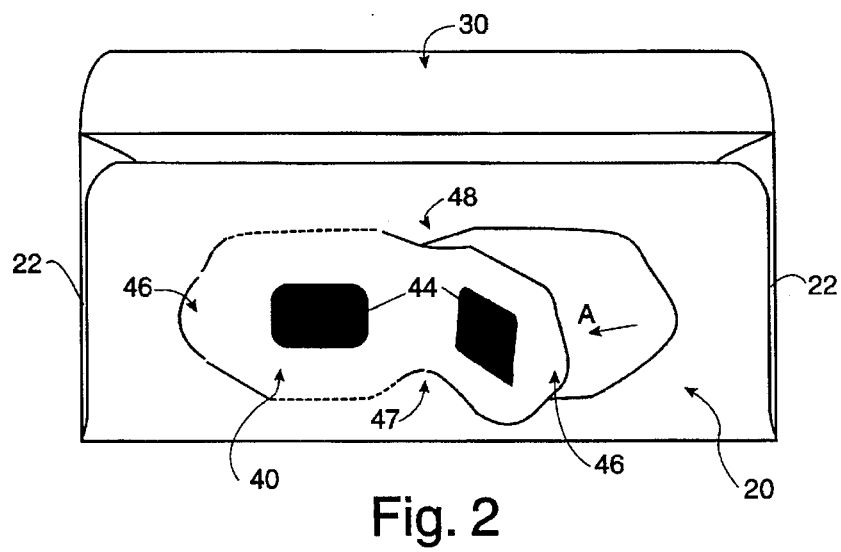
FIG. 2 shows the embodiment of FIG. 1, wherein a delineated portion is partially removed from the envelope.

One embodiment of the present invention is shown in FIGS. 1 and 2. The envelope shown includes a forward panel 10, a rear panel 20, a flap 30 and glasses 40 integral with the rear panel 20. The forward panel 10 and rear panel 20 are secured to each other along the side edges 22 and share the folded bottom edge 24. The top edge 26 of the rear panel 20 is free of the forward panel 10 to provide access to the interior of the envelope. The forward panel 10 is longer than the rear panel 20, and the excess length constitutes a flap 30 which can be folded along an edge down over the opening of the envelope to serve as a closure and safely retain any contents of the envelope.

Figure 3:
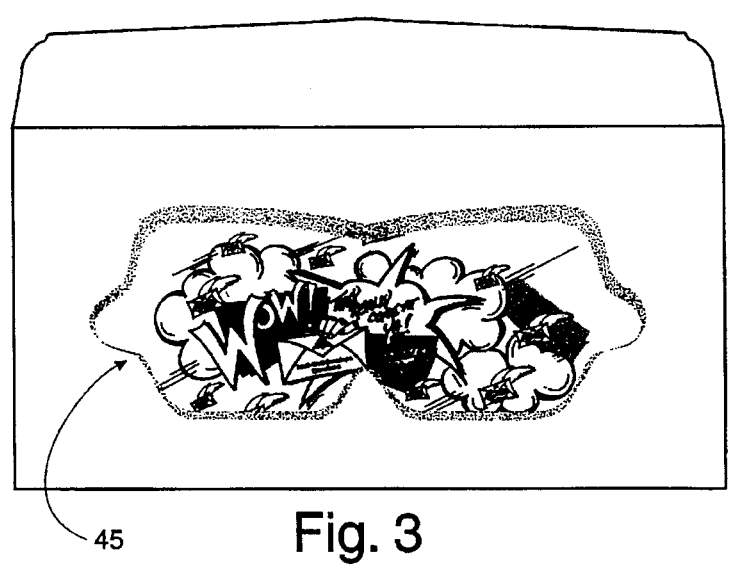
FIG. 3 shows an embodiment of an envelope having a printed message thereon.
Figure 4:
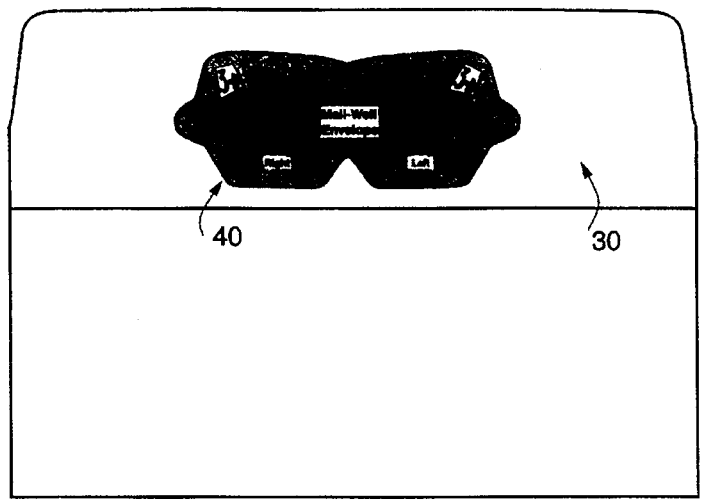
FIG. 4 shows an embodiment of an envelope wherein the glasses are located on the flap of the envelope.
Figure 5A:
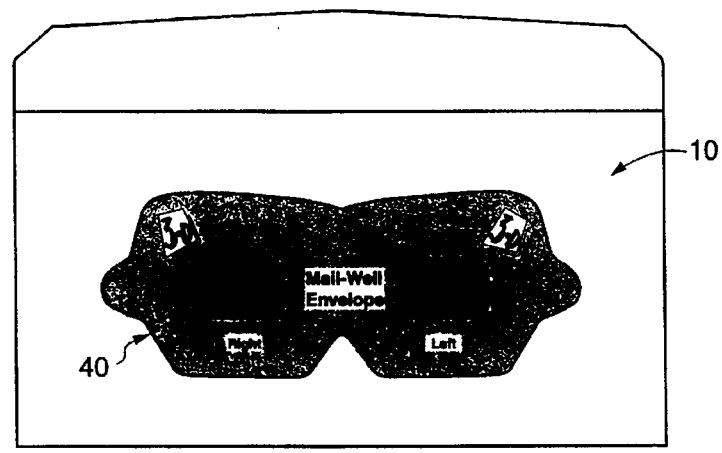
FIG. 5a shows an embodiment of an envelope wherein the glasses are located on the front panel of the envelope.
Figure 5B:
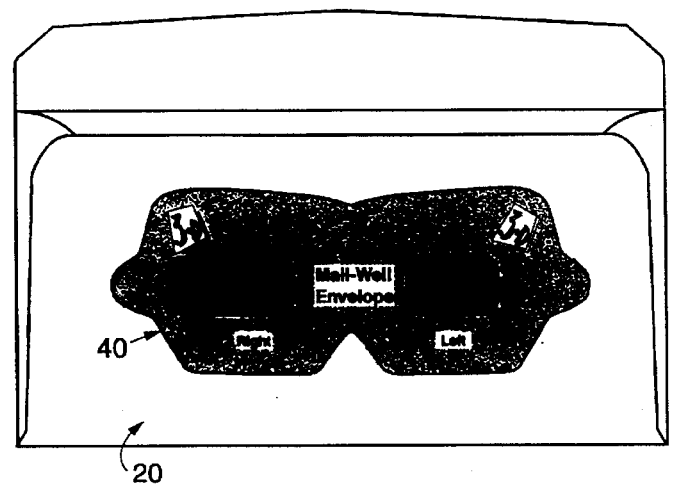
FIG. 5b shows the embodiment of FIG. 5a, wherein a second set of glasses is located on the rear panel of the envelope.
Figure 6A:
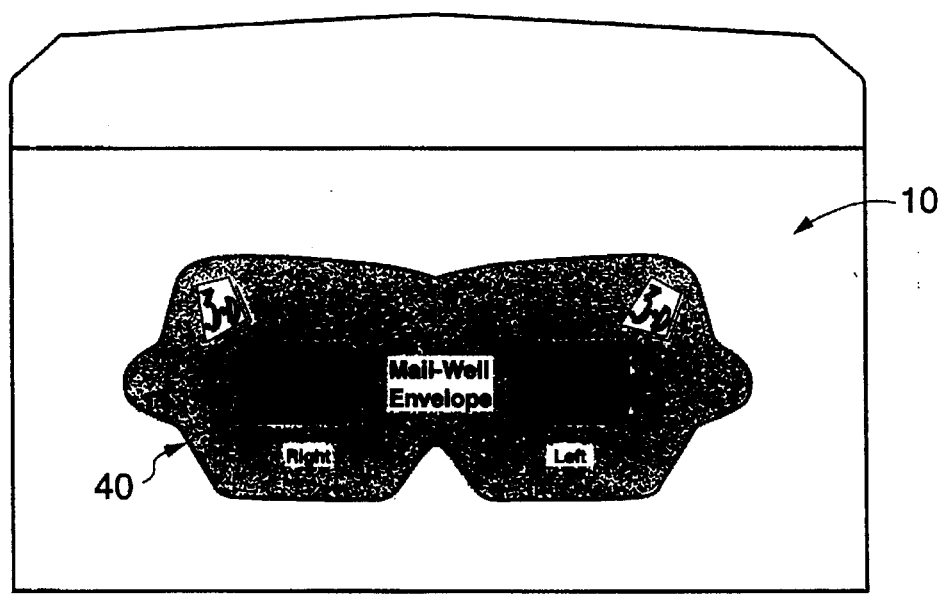
FIG. 6a shows an embodiment of an envelope wherein the glasses are located on the front panel of the envelope.
Figure 6B:
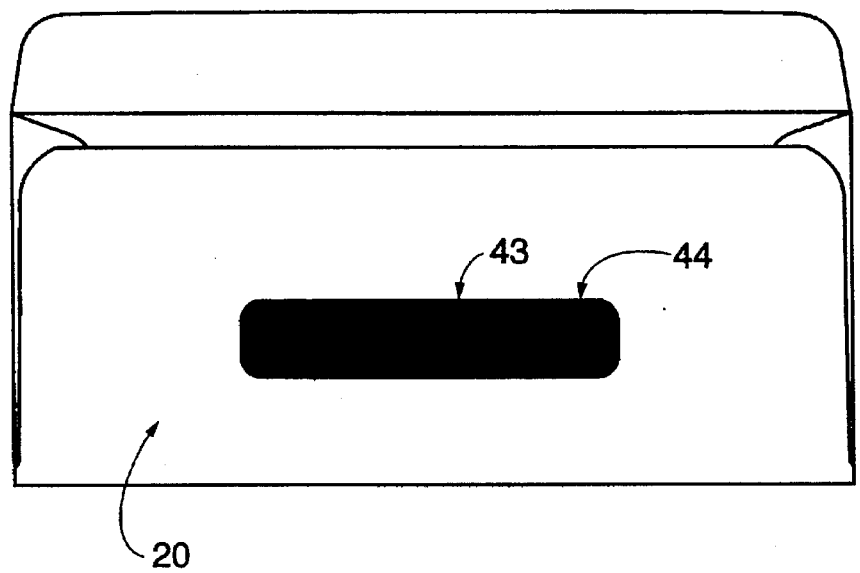
FIG. 6b shows the embodiment of FIG. 6a, wherein the rear panel of the envelope includes an opening with optical filter material opposite the glasses.

As shown in FIGS. 1 and 2, the glasses 40 include two eye openings 42, optical filter material 44 covering each eye opening 42, temple tabs 46, a nose notch 47 and a bridge notch 48. The glasses 40 are intended for use by the recipient of the envelope. As shown in FIGS. 1 and 2, the glasses 40 are located on the rear panel 20. The glasses 40 can additionally or separately be located, for example, on the forward panel 10 and/or on the flap 30, as shown in FIGS. 4, 5a and 5b. Further, the glasses 40 can be located opposite an opening having optical filter material. For example, as shown in FIGS. 6a and 6b, the glasses 40 are located on the forward panel 10 and an opening 43, having optical filter material 44, is located on the rear panel 20 opposite the glasses 40. For example, the recipient can use the glasses 40 in typical fashion, i.e. aligning the eye openings 42 with the recipient's eyes and viewing objects. The glasses 40 can be used to view objects not readily visible without the use of the glasses 40 by the use of optical filter material 44 capable of filtering certain color or colors. For example, optical filter material 44 can be positioned in one eye opening 42 to filter optical radiation having a wave length of about 4550 Angstroms to about 4920 Angstroms, and the optical filter material 44 positioned in the other eye opening 42 can be used to filter optical radiation having a wave length of about 6220 Angstroms to about 7700 Angstroms. By way of further example, optical filter material 44 capable of filtering more than one color can be used to emphasize or create special effects as to messages 45 contained on the exterior of an envelope as shown in FIG. 3, or on paper matter contained within an envelope. Further, optical filter material 44 capable of filtering the color red for one eye opening 42, and the color blue for the other eye opening 42, can be used to give an affect similar to 3-D glasses. In this regard, printed matter on the envelope or the envelope's contents can include a first portion which is only visible through one of the eye openings 42, and a second portion which is only visible through the other eye opening 42.

As shown in FIG. 1, the glasses 40 are delineated by perforations 50. Alternatively, the glasses 40 can be delineated by printing for removal by cutting. The perforations 50 are provided to facilitate removal of the glasses 40 from the envelope. FIG. 2 shows the glasses 40 partially removed from the envelope in the direction A. The perforations 50 along the outer edge of the glasses 40 can be made during assembly of the envelope using a specially manufactured die.

As stated above, a primary function of envelopes is to protect the contents of the envelope during transport from one person or business to another, including transport via carrier delivery system such as the United States Postal Service. Thus, the glasses 40 must be able to withstand the rigorous handling normally associated with a carrier delivery system. For example, the glasses 40 are intended for use by the recipient and should be easily removable by the recipient without tearing the glasses 40. However, the glasses 40 should not be removable during transport. As a consequence, the length of the perforations and the material between adjacent perforations should allow for the recipient's easy removal of the glasses 40 without tearing the glasses 40 and should prevent the glasses 40 from prematurely being torn or removed during transport of the envelope via a carrier delivery system. Thus, in the embodiment shown in FIG. 1, the perforations along the outer edge of the glasses 40 should comprise a length at least about 0.025 inch and no more than about 0.75 inch with no more than about 0.020 inch between adjacent perforations.

The glasses 40 can be any number of different shapes. Preferably, the glasses 40 are shaped similarly to typical glasses. The glasses 40 are intended to be used by a recipient of an envelope by the recipient aligning the eye openings 42 with the recipient's eyes and viewing objects. The glasses 40 can include features which assist the recipient with aligning the glasses 40 with the recipient's facial features. The glasses 40 can also include features which minimize the amount of light which may enter along the outer edges of the glasses 40 and into the recipient's line of vision, when the glasses 40 are in use. For example, the glasses 40 can include a nose notch 47 and a bridge notch 48. The nose notch 47 can be used to assist the recipient with aligning the glasses 40 with the recipient's eyes and to block unfiltered light from entering along the bottom edge of the glasses 40. The bridge notch 48 can be used to block unfiltered light from entering along the top edge of the glasses 40.

The glasses 40 can include a portion that is easily grasped when removing the glasses 40 from the envelope. For example, the glasses 40 can include temple tabs 46 which can be grasped by recipient when the recipient pulls the glasses 40 away from the envelope, thereby causing the glasses 40 to separate from the envelope along the outer edge of the glasses 40. Further, the temple tabs 46 can be used by the recipient to hold the glasses 40 in place when the glasses are being used. For example, the recipient can maintain the alignment of the glasses 40 with the recipient's eyes by holding the holding the temple tabs 46 against the recipient's temples.

As shown in FIG. 1, the glasses 40 have an outer edge which includes a temple tab portion 60, a top rim portion 70, a bridge notch portion 80, a nose notch portion 90 and a bottom rim portion 100. As described above, one of the two temple tabs 46 can be grasp and pulled away from the envelope by the recipient. As a consequence, the temple tab portion 60 is first separated from the envelope. As the recipient continues to pull the glasses 40 away from the envelope, the top rim portion 70 and bottom rim portion 100 are removed from the envelope. Next, the bridge notch portion 80 and the nose notch portion 90 are removed from the envelope. Finally, the remaining top rim portion 70 and bottom rim portion 100 are separated from the envelope leaving the remaining temple tab portion 60 which is also separated.

The temple tab portion 60 includes the temple tab 46. As discussed above, the temple tab 46 can be used to grasp and pull the glasses 40 from the envelope. In this regard, it is useful that the perforations be spaced such that the glasses are not torn upon removal. Additionally, it is useful that the perforations be spaced such that the glasses will not be removed during envelope transport. Preferably, the perforations along the edge of the temple tab portion 60 are a length at least about 0.25 inch and no more than about 0.75 inch with no more than about 0.020 inch between adjacent perforations. Preferably, the perforations along the edge of the top rim portion 70 are a length at least about 0.025 inch and no more than about 0.050 inch with no more than about 0.010 inch between adjacent perforations. Preferably, the perforations along the edge of the bottom rim portion 100 are a length at least about 0.025 inch and no more than about 0.050 inch with no more than about 0.010 inch between adjacent perforations. The bridge notch portion 80 includes the bridge notch 48 having a first point 82. Preferably, the first point 82 comprises an unremoved portion between adjacent perforations. The nose notch portion 90 includes the nose notch 47 having a second point 92. Preferably, the second point 92 comprises an unremoved portion between adjacent perforations. Preferably, the perforations along the edge of the bridge notch portion 80 are a length at least about 0.025 inch and no more than about 0.050 inch with no more than about 0.010 inch between adjacent perforations. Preferably, the perforations along the edge of the nose notch portion 90 are a length at least about 0.025 inch and no more than about 0.050 inch with no more than about 0.010 inch between adjacent perforations.

The foregoing description of the present invention has been presented for purposes of illustration and description. The description is not intended to limit the invention to the form disclosed herein. Consequently, the invention and modifications commensurate with the above teachings and skill and knowledge of the relevant art are within the scope of the present invention. The preferred embodiment described above is also intended to explain the best mode known of practicing the invention and to enable others skilled in the art to utilize the invention in various embodiments and with the various modifications required by their particular applications for use of the invention. It is intended that the appended claims be construed to include all alternative embodiments as permitted by the prior art.

What is claimed is:

1. An envelope having a printed portion thereon, said envelope comprising:
   (a) a first layer defining a first side;
   (b) a second layer defining a second side and directly adjoining said first side, wherein said second side is immediately adjacent and parallel face-to-face relation to, said first side;
   one of said first layer and said second layer comprising:
   (i) a flap portion;
   (ii) a delineated portion defining part of said layer and spaced from the peripheral edges of said layer;
   (iii) a first window and a second window positioned within said delineated portion;
   (iv) a first optical radiation filter positioned within said first window for filtering radiation of a predetermined wavelength;
   (v) a second optical radiation filter positioned within said second window for filtering radiation of a predetermined wavelength;
   wherein said delineated portion is defined by perforations and wherein said delineated portion is removable by a recipient of the envelope to view through said first and second optical radiation filters the printed portion in three dimensional detail.

2. An envelope as set forth in claim 1, wherein said predetermined wavelength for said first optical radiation filter is different from said second predetermined wavelength for said optical radiation filter.

3. An envelope as set forth in claim 1, wherein said perforations comprise a length of at least about 0.025 inch and no more than about 0.75 inch with no more than about 0.020 inch between adjacent perforations.

4. An envelope as set forth in claim 1, wherein said delineated portion further comprises at least one temple tab.

5. An envelope as set forth in claim 4, wherein the length of said perforations defining said temple tab is of a least about 0.25 inch and no more than about 0.75 inch, with no more than about 0.020 inch between adjacent perforations.

6. An envelope as set forth in claim 1, wherein said delineated portion further comprises a nose notch.

7. An envelope as set forth in claim 6, wherein the length of said perforations defining said nose notch is of a least about 0.025 inch and no more than about 0.050 inch, with no more than about 0.010 inch between adjacent perforations.

8. An envelope as set forth in claim 1, wherein said delineated portion further comprises a bridge notch.

9. An envelope as set forth in claim 8, wherein the length of said perforations defining said bridge notch is of a least about 0.025 inch and no more than about 0.050 inch, with no more than about 0.010 inch between adjacent perforations.

10. An envelope as set forth in claim 1, wherein said flap portion comprises said delineated portion.

11. An envelope as set forth in claim 1, wherein said first optical radiation filter substantially covers said first window and said second optical radiation filter substantially covers said second window.

12. An envelope as set forth in claim 1, wherein said first layer comprises said delineated portion, wherein said second layer comprises:
   (i) a second delineated portion defining part of said second layer and spaced from the peripheral edges of said second layer; and
   (ii) at least one window positioned within said second delineated portion.

13. An envelope as set forth in claim 12, wherein an optical radiation filter for filtering radiation of a predetermined wavelength is positioned within said window positioned within said second delineated portion.

14. An envelope as set forth in claim 1, wherein the length of said perforations are selected from the group of:
   (i) perforations having a length of a least about 0.025 inch and no more than about 0.050 inch, with no more than about 0.010 inch between adjacent perforations; or
   (ii) perforations having a length of at least about 0.25 inch and no more than about 0.75 inch, with no more than about 0.020 inch between adjacent perforations.

15. An envelope as set forth in claim 1, wherein said optical radiation filters are selected from the group of:
   (i) optical radiation filters capable of filtering optical radiation of about 4550 Angstroms to about 4920 Angstroms; or
   (ii) optical radiation filters capable of filtering optical radiation of about 6220 Angstroms to about 7700 Angstroms.

16. An envelope comprising removable glasses capable of withstanding the rigors of a mailing system, said envelope comprising:

(a) a first layer defining a first side;

(b) a second layer defining a second side, wherein said second side is immediately adjacent said first side;

one of said first layer and said second layer comprising a flap portion;

said flap portion comprising:
- (i) a delineated portion defining part of said flap portion and spaced from the peripheral edges of said flap portion;
- (ii) at least two perforations along the outer edge of said delineated portion;
- (iii) at least two openings;
- (iv) optical radiation filters substantially covering said openings;

wherein said delineated portion is removable from said flap portion for viewing through said optical radiation filters.

17. An envelope as set forth in claim 16, wherein said perforations comprise a length at least about 0.025 inch and no more than about 0.75 inch with no more than about 0.020 inch between adjacent perforations.

18. An envelope capable of being used as glasses for viewing objects which are substantially not visible absent said glasses, said envelope comprising:

(a) a first layer defining a first side;

(b) a second layer defining a second side and directly adjoining said first side, wherein said second side is immediately adjacent and parallel face-to-face relation to, said first side;

(c) viewing means delineated on at least one of said first and said second layers and spaced from the peripheral edges of said layer, said viewing means comprising at least two openings, said openings being substantially covered by optical radiation filters selected from the group of:
- (i) optical radiation filters capable of filtering optical radiation of about 4550 Angstroms to about 4920 Angstroms; or
- (ii) optical radiation filters capable of filtering optical radiation of about 6220 Angstroms to about 7700 Angstroms; and wherein said delineation of said viewing means is defined by perforations;

wherein the length of said perforations are selected from the group of:
- (i) perforations having a length of a least about 0.025 inch and no more than about 0.050 inch, with no more than about 0.010 inch between adjacent perforations; or
- (ii) perforations having a length of at least about 0.25 inch and no more than about 0.75 inch, with no more than about 0.020 inch between adjacent perforations.

19. An envelope comprising:

(a) a first layer defining a first side;

(b) a second layer defining a second side and directly adjoining said first side, wherein said second side is immediately adjacent and parallel face-to-face relation to to said first side;

wherein said first layer comprises a delineated portion defining part of said layer;

wherein said second layer comprises:
- (i) at least one window;
- (ii) an optical radiation filter positioned within said window for filtering radiation of a predetermined wavelength;

wherein said delineated portion is removable from the envelope to allow for viewing through said optical radiation filter.

* * * * *